United States Patent Office 2,776,980
Patented Jan. 8, 1957

2,776,980

HALOMETHYLATION OF 2-HALOTHIOPHENES

Lucas P. Kyrides, Zeeland, Mich., and Ferdinand C. Meyer, Kirkwood, and Ferdinand B. Zienty, Brentwood, Mo., assignors to Monsanto Chemical Company, St. Louis, Mo., a corporation of Delaware No Drawing. Application August 6, 1952,
Serial No. 303,004

6 Claims. (Cl. 260—332.5)

This invention relates to halogenated sulfur containing heterocyclic compounds and more particularly relates to a novel method for the halomethylation of 2-halothiophene.

It is well known that chloromethylation of thiophene and its derivatives with formaldehyde and hydrogen chloride by the usual techniques, such as by the addition of a concentrated aqueous formaldehyde solution into a mixture of the thiophene and concentrated hydrochloric acid while passing in a rapid stream of hydrogen chloride, results in low yields and excessive by-product and tar formation. Moreover, certain of the chloromethylated thiophene derivatives when thus prepared are unstable and special methods must be employed in their isolation, purification and storage. Chloromethylation of 2-chlorothiophene under the mild conditions employed in the chloromethylation of thiophene as described in U. S. Patent No. 2,527,680 is not completely satisfactory for an industrial process because of the rather slow reaction and considerable by-product formation. Consequently, special methods have been devised for the chloromethylation of 2-chlorothiophene. The best of these special methods for the chloromethylation of 2-chlorothiophene is one reported by Rosenthal, J. A. C. S. 73, 5902 (1951), which involves employing trioxane, HCl gas and fused zinc chloride with 2-chlorothiophene in an anhydrous medium. However, even when the chloromethylation of 2-chlorothiophene is carried out in this manner, a yield of only 44.5% is obtained.

A most unusual process has now been discovered whereby the halomethylation of 2-halothiophenes can be carried out in an aqueous medium at a higher reaction rate and with a minimum of tar forming side reactions to give excellent yields almost double the yields of the best prior art process. Although this process is equally applicable to the preparation of 2-bromo-5-bromomethylthiophene, the process will be described with particular reference to 2-chloro-5-chloromethylthiophene. This new process comprises first preparing a concentrated aqueous solution of formaldehyde and HCl and then adding this solution slowly to the 2-chlorothiophene and carrying out the reaction in the presence of a small quantity of a zinc halide. The quantity of zinc halide employed in this process can be varied from about 0.01 to about 0.3 mole per mole of thiophene as will hereinafter be demonstrated.

When the above described process is employed, the 2-chloro-5-chloromethylthiophene can be readily recovered from the reaction mixture produced by the process as will hereinafter be illustrated.

The reaction involved in the process of this invention is highly exothermic and requires external cooling throughout the reaction. In order to keep the tar-forming side reactions at a minimum, the process should be carried out at a temperature below about 50° C. Too low a reaction temperature, say 0° to 20° C. may result in a reaction too slow to be satisfactory for an industrial process. However, when the process is carried out at a temperature of from about 30° C. to about 50° C., the reaction rate is high enough to be quite satisfactory for industrial practice.

The cold aqueous hydrogen chloride-saturated solution of formaldehyde can be prepared by cooling a concentrated aqueous solution of formaldehyde to about 0° C. and then saturating this solution under external cooling conditions with hydrogen chloride. According to another method, a solution of formaldehyde in concentrated hydrochloric acid can be saturated with hydrogen chloride with external cooling. Hydrogen chloride-saturated solutions of formaldehyde made by either method can be employed in the process of this invention.

The following examples will illustrate the process of this invention.

*Example I*

To a 500 ml. 3-necked flask there was charged 81 g. of a 37% formaldehyde solution and 96 ml. of 36% hydrochloric acid. The resulting solution was cooled to a temperature between 0° and 10° C. and then dry HCl gas was passed into the cooled solution until a weight increase of approximately 75 g. was obtained. This mixture was added slowly to 118.6 g. (one mole) of 2-chlorothiophene cooled to 0° C. The mixture darkened somewhat after the addition of a small portion of the aqueous solution, but no heat was evolved. The temperature of the mixture was allowed to rise to room temperature while about 10 to 15% of the HCl-formaldehyde mixture was added. Darkening of the mixture continued, but the desired reaction, as evidenced by little or no heat evolution, was extremely slow. At this point 30 g. of zinc chloride (0.275 mole per mole of 2-chlorothiophene) were added to the reaction mixture and the temperature of the reaction mixture rose rapidly to between 35 and 40° C. External cooling of the reacting mixture was required to maintain a temperature between 35 and 40° C. while the remainder of the HCl-formaldehyde solution was added over a period of about 90 minutes. After all of the HCl-formaldehyde solution had been added, the reaction mixture was agitated for an additional 40 minutes and then quenched with cold water. This quenched reaction mixture separated into two layers. The lower oil layer which separated from the reaction mixture was recovered and washed immediately with water, with an aqueous sodium bicarbonate solution and again with water. This washed oil was dried for a short period over anhydrous sodium sulfate and distilled under vacuum through a short fractionating column. After a small forerun of unreacted 2-chlorothiophene, there was obtained 115 g. of 2-chloro-5-chloromethylthiophene at a boiling point of 86–87° C. at an absolute pressure of 10 mm. of mercury. This material was found to have a refractive index of 1.5735 at 25° C. and a chlorine content of 42.37%. The yield was 72% based upon the 2-chlorothiophene consumed.

*Example II*

An aqueous solution prepared by combining 225 ml. of 37% formaldehyde and 228 ml. of concentrated aqueous hydrogen chloride (36%) was saturated with HCl gas to a weight gain of approximately 258 g. at a temperature between 0° and 10° C. This aqueous solution was added slowly to a reaction vessel containing 357.8 g. of 2-chlorothiophene and 5 g. of zinc chloride, 0.015 mole per mole of 2-chlorothiophene. The temperature of the reaction mixture was maintained at 35° to 45° C. while the HCl-formaldehyde solution was being added. In one hour the addition of the HCl-formaldehyde solution was complete. The reaction mixture was held at a temperature between 40 and 45° C. for two hours after which time 570 ml. of cold water were added to cool and quench the reaction mixture. The lower oil layer which formed was removed from the quenched reaction mixture and washed successively with four 200 ml. portions of cold water. After adding 7 g. of dicyclohexylamine as a stabilizer to the oil layer, the crude oil was distilled under vacuum through a short fractionating column. A small forerun of recovered 2-chlorothiophene amounting to 34.2 g. was recovered. Then 369.7 g. of 2-chloro-5-chloromethylthiophene were collected at 88–95° C. at an absolute pressure of 12 mm. of mercury. This is an 80.7% yield based on the 2-chlorothiophene consumed. The 2-chloro-5-chloromethylthiophene recovered from this process had a refractive index of 1.5733 at 25° C.

As illustrated in Example I above, the halomethylation carried out in the absence of a zinc halide takes place much too slowly to be useful for an industrial process. Also as illustrated in the above examples, only a small quantity of the zinc halide need be employed to obtain satisfactory results. The preferred catalyst for the purposes of this invention is zinc chloride for chloromethylation and zinc bromide for bromomethylation because at their preferred concentration of 0.01 to 0.3 mole per mole of thiophene compound the halomethylation takes place at an easily controlled high reaction rate with a minimum of undesirable tar-forming side reactions.

What is claimed is:

1. In the process of preparing 2-chloro-5-chloromethylthiophene by the chloromethylation of 2-chlorothiophene with formaldehyde and HCl, the steps comprising reacting 2-chlorothiophene with an aqueous solution of formaldehyde saturated with hydrogen chloride, in the presence of zinc chloride and at a temperature below 50° C., until heat is no longer given off, cooling and quenching the resulting mixture by the addition of cool water whereby an aqueous layer and an oily layer are formed, recovering said oily layer and recovering therefrom 2-chloro-5-chloromethylthiophene.

2. The process of claim 1 wherein there is present from about 0.01 to about 0.3 mole of zinc chloride for each mole of 2-chlorothiophene.

3. In the process for the preparation of halo-methylated derivatives of thiophene selected from the class consisting of bromomethylated and chloromethylated thiophene compounds in the presence of a catalyst, the step comprising reacting a member selected from the class consisting of 2-chlorothiophene and 2-bromothiophene in the presence of a small quantity of zinc halide selected from the class consisting of zinc chloride and zinc bromide at a temperature of from 0° C. to 50° C. with the product obtained by saturating an aqueous solution of formaldehyde with a compound selected from the class consisting of hydrogen bromide and hydrogen chloride.

4. In the process for preparing chloromethylated derivatives of 2-chlorothiophene in the presence of a catalyst, the steps comprising saturating a cold aqueous mixture of formaldehyde and hydrochloric acid with hydrogen chloride, adding the resulting aqueous solution to a mixture comprising 2-chlorothiophene and a small quantity of zinc chloride and maintaining a reaction temperature from 0° C. to 50° C.

5. In the process for preparing 2-chloro-5-chloromethylthiophene by the chloromethylation of 2-chlorothiophene in the presence of a catalyst, the steps comprising slowly combining at a temperature of from 0° C. to 50° C. a cold aqueous solution of formaldehyde saturated with HCl to a mixture comprising 2-chlorothiophene and from about 0.01 to about 0.3 mole of zinc chloride per mole of said thiophene, and maintaining the resulting mixture at temperature of from 0° C. to 50° C.

6. In the process for preparing 2-chloro-5-chloromethylthiophene by the chloromethylation of 2-chlorothiophene in the presence of a catalyst, the step comprising reacting an aqueous solution of formaldehyde saturated with hydrogen chloride with 2-chlorothiophene in the presence of a small quantity of zinc chloride.

References Cited in the file of this patent

UNITED STATES PATENTS

| | | |
|---|---|---|
| 2,527,680 | Kyrides et al. | Oct. 30, 1950 |
| 2,541,408 | Cockerille | Feb. 13, 1951 |
| 2,613,214 | Pines | Oct. 7, 1952 |
| 2,623,049 | Norris | Dec. 23, 1952 |

OTHER REFERENCES

Griffing et al.: J. Am. Chem. Soc., 70, 3416–19, October 1948.

Rosenthal: J. Am. Chem. Soc., 73, 5902–03, December 1951.

Clapp: JACS, 69:1549 (1947).

Blicke: JACS, 68:1934 (1946).